US012634792B2

(12) United States Patent
Bunde et al.

(10) Patent No.: US 12,634,792 B2
(45) Date of Patent: *May 19, 2026

(54) PUBLIC WARNING BASED ON UE TRAJECTORY CALCULATIONS AT RIC-ORAN IN 4G AND 5G SYSTEMS

(71) Applicant: Parallel Wireless, Inc., Nashua, NH (US)

(72) Inventors: Pankaj Bunde, Pune (IN); Praveen Jain, Pune (IN); Lakhan Sharma, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 62 days.

This patent is subject to a terminal disclaimer.

(21) Appl. No.: 18/341,758

(22) Filed: Jun. 27, 2023

(65) Prior Publication Data

US 2025/0008405 A1     Jan. 2, 2025

Related U.S. Application Data

(60) Provisional application No. 63/355,244, filed on Jun. 24, 2022.

(51) Int. Cl.
*H04W 36/18* (2009.01)
*H04W 36/00* (2009.01)
*H04W 36/32* (2009.01)

(52) U.S. Cl.
CPC ..... *H04W 36/322* (2023.05); *H04W 36/0033* (2013.01); *H04W 36/18* (2013.01)

(58) Field of Classification Search
CPC ...................... H04W 36/322; H04W 36/0033; H04W 36/18
See application file for complete search history.

(56) References Cited

U.S. PATENT DOCUMENTS

| | | | |
|---|---|---|---|
| 11,096,032 B2 | 8/2021 | Raje et al. | |
| 11,889,369 B1 * | 1/2024 | Dharmadhikari ... | H04W 36/085 |
| 2022/0400454 A1 | 12/2022 | Park et al. | |
| 2023/0117005 A1 * | 4/2023 | Ang ...................... | H04L 5/0005 |
| | | | 370/331 |
| 2023/0413126 A1 * | 12/2023 | Bunde .................... | H04W 36/18 |
| 2024/0214859 A1 * | 6/2024 | Chen ................... | H04W 64/006 |

* cited by examiner

*Primary Examiner* — Ayman A Abaza
*Assistant Examiner* — Benjamin T. Ranew
(74) *Attorney, Agent, or Firm* — Michael Y. Saji

(57) ABSTRACT

A method is disclosed of providing user equipment (UE) mobility context creation in 4G and 5G systems, comprising: downloading, by a non-real time (non-RT) Radio Intelligent Controller (RIC), a policy to connected centralized units (CUs) that whenever a User Equipment (UE) attaches to a CU and the UE's location changes, the Non-RT RIC be updated about UE's mobility; allocating, by the Non RT RIC, a fresh UE identifier (ID) and creating a context with parameters including Current Location, UE ID allotted by RIC, Current cell radio network temporary identifier (C-RNTI), and cell information; sending the fresh UE ID to the CU that the CU maintains as part of the UE context information; determining whenever the UE moves within the CU served distributed units (DUs), and updating the Non-RT RIC about UEs mobility.

6 Claims, 5 Drawing Sheets

PUBLIC WARNING BASED ON UE TRAJECTORY CALCULATIONS AT RIC-ORAN IN 4G AND 5G SYSTEMS

CROSS-REFERENCE TO RELATED APPLICATIONS

The present application claims priority under 35 U.S.C. § 119(e) to U.S. Provisional Patent Application No. 63/355,244, having the same title as the present application and filed Jun. 24, 2022, which is hereby incorporated by reference in its entirety for all purposes. The present application also hereby incorporates by reference, for all purposes, each of the following U.S. Patent Application Publications in their entirety: US20170013513A1; US20170026845A1; US20170055186A1; US20170070436A1; US2017-0077979A1; US20170019375A1; US20170111482A1; US20170048710A1; US20170127409A1; US2017-0064621A1; US20170202006A1; US20170238278A1; US20170171828A1; US20170181119A1; US2017-0273134A1; US20170272330A1; US20170208560A1; US20170288813A1; US20170295510A1; US2017-0303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. patent application Ser. No. 18/174,580, U.S. Pat. App. Pub. Nos. US20170273134A1, US20170127409A1, U.S. patent application Ser. No. 18/338,342 in their entirety.

BACKGROUND

Open Radio Access Network (Open RAN) is a movement in wireless telecommunications to disaggregate hardware and software and to create open interfaces between them. Open RAN also disaggregates RAN from into components like RRH (Remote Radio Head), DU (Distributed Unit), CU (Centralized Unit), Near-RT (Real-Time) and Non-RT (Real-Time) RIC (RAN Intelligence Controller). Open RAN has published specifications for the 4G and 5G radio access technologies (RATs).

3GPP Public Warning Systems were first specified in Release 8, allowing for direct warnings to be sent to mobile users. The PWS is used to alert the public to events such as disasters. For instance, when earthquakes, tsunamis, hurricanes, or wildfires occur, the PWS can be used to notify people to evacuate impacted areas within a certain time. In addition, the PWS can be used to notify people of a Child Abduction Emergency (e.g., AMBER alert). PWS notifications should be delivered accurately and in a timely manner to the public in order to help people prepare sufficiently for events.

Public Warning System support in the 5G architecture relies on the usage of the concept called Cell Broadcasting—the ability to trigger the radio network to transmit one single short message to multiple devices in the network simultaneously. Messages are broadcast either within the whole network or within certain geographical areas, down to the size of a single radio cell. This is controlled from the network on request from the originator of the message.

In today's telecom networks Core Nodes maintain the UE context with permanent identifiers like SUPI (subscription permanent identifier) & IMSI (international mobile subscriber identity). And Access nodes maintain the UE context dynamically with identifiers like STMSI (short temporary mobile subscriber identifier), RNTI (radio network temporary identifier) etc. The contexts at Access nodes are temporary and exist till the node is handling the UE connectivity. As soon as the UE moves to other Access Nodes this context is deleted. Hence for Policy enforcement and related operations the responsibility lies on the Core Nodes and the Access Nodes just provide with the needed updates (e.g. location) to the Core Nodes. This is also done keeping in mind security of the User.

With the advent of ORAN and 5G there are many use cases that need the dynamic data of UE to calculate UE mobility and other parameters so that related policies can be enforced. Tasking Core Nodes for these operations will add to the overhead of processing and subsequent delays. Since ORAN RIC will be a centralized entity in the Access, apt solution will be to have a semi-permanent UE context in ORAN RIC that can use the dynamic data of UE collected from Access Nodes (O-CU/O-DU, O-eNB) and enforce related policies.

In 2G and 3G, the mobile architectures had controllers that were responsible for RAN orchestration and management. With 4G, overall network architecture became simplified and the expectation was that, to enable optimal subscriber experience, base stations would use the X2 interface to communicate with each other to handle resource allocation.

SUMMARY

Figure 1:
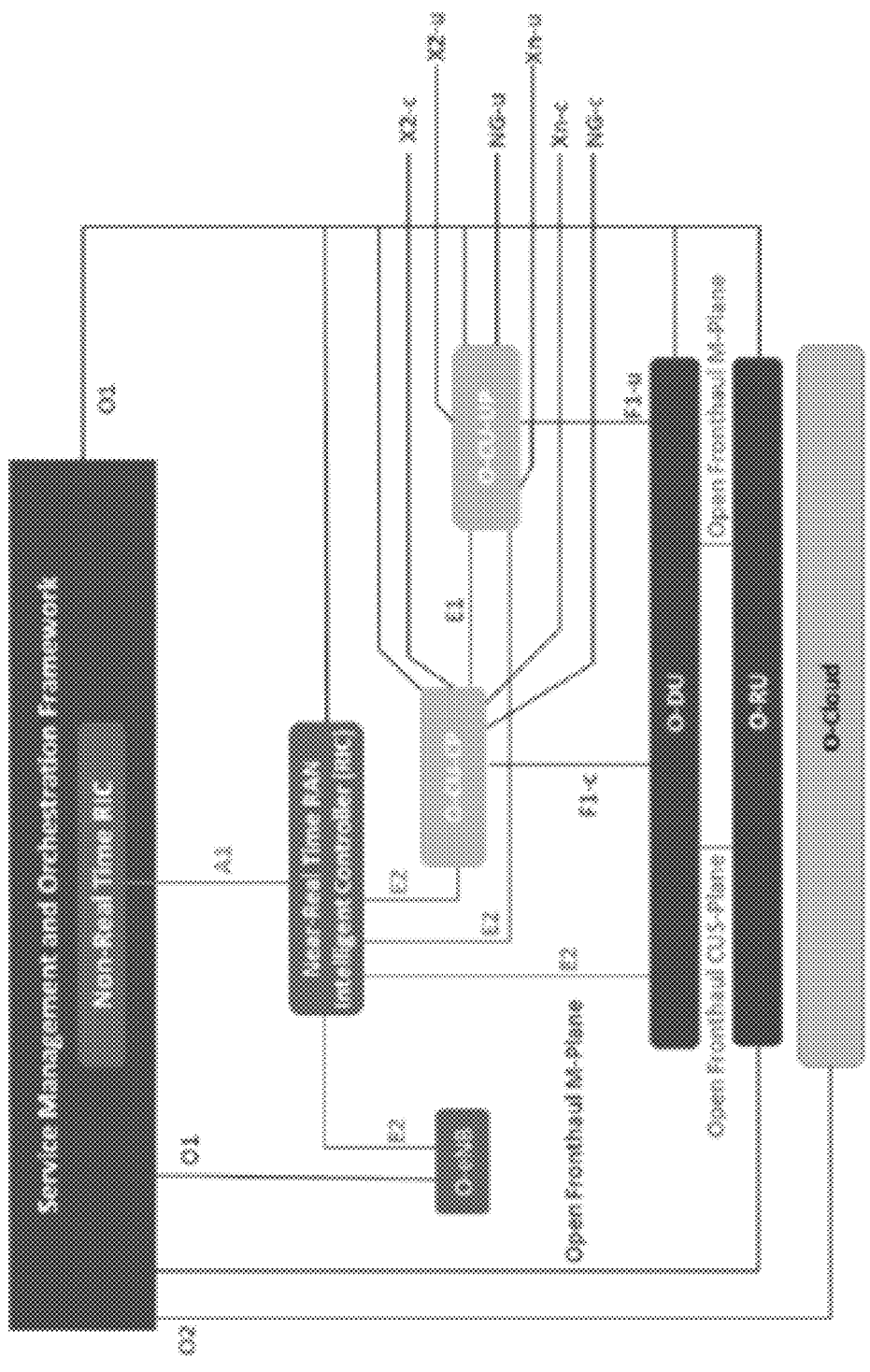
FIG. 1 is a schematic diagram of an Open RAN 4G/5G deployment architecture, as known in the prior art.

Public Warning System helps protect lives and property by enabling governments to provide timely alerts to at-risk citizens when natural disasters, public health threats and human-induced emergencies arise.

Public warning systems should alert and inform all citizens that are threatened by a hazard with the final purpose of enabling them to prepare and to act in a timely manner to reduce the impact of the hazard.

It is of utmost importance to initiate warning messages well in advance to People who are either moving towards or planning to move in the affected area. So that people can avoid visiting these affected areas.

Understanding of user's mobility pattern can be achieved by keeping a track of users mobility context across the access nodes. Once the UE's mobility pattern is calculated, warning messages can be sent to users in advance before reaching or moving towards this area.

In one embodiment, a method of providing UE mobility context creation at RIC/ORAN in 4G and 5G systems is disclosed, comprising: downloading, by a non RT RIC, a policy to connected centralized units (CUs) that whenever a User Equipment (UE) attaches to a CU and the UE's location changes, the Non-RT RIC be updated about UE's mobility; allocating, by the Non RT RIC, a fresh UE ID and creating a context with parameters including Current Location, UE ID allotted by RIC, Current CRNTI, and cell information; sending, by the Non RT RIC, the fresh UE ID to the CU that the CU maintains as part of the UE context information; determining whenever the UE moves within the CU served DUs, and updating the Non-RT RIC about UEs mobility using RIC_UEID as the key; sending, by the target CU once the UE may be successfully transferred to target CU, the update to RIC with RIC_UEID; updating, by the RIC, the UE context with the provided details; using the UE context updated on every UE movement to calculate the UE's trajectory; determining the UE may be moving to an impacted region; and triggering a corresponding O-RAN Central Unit (O-CU)/O-RAN eNodeB (O-eNB) to alert the UE using a public warning system (PWS) message.

The method may further comprise determining that the UE may be moving seamlessly from across CUs in connected mode using S1/X2/N2/Xn Handovers. The method may further comprise downloading, by the non-RT RIC, a policy to connected CUs that whenever a UE latches with initial UE message, CU sends an Identity Request to get the UE's SUPI. The method may further comprise downloading, by a non-RT RIC, a policy to connected CUs that whenever the UE attaches to the CU/DU with the initial UE message, the SUPI may be learnt and sent back to the Non-RT RIC, along with the SUPI CU/DU and sends CRNTI, STMSI, cell information.

The method may further comprise determining whenever the UE moves from this CU to another CU through handover, transferring the RIC_UEID to the target CU as part of the handover context information exchanged. The CU may be a 5G New Radio (NR) base station with separate centralized unit (CU) and distributed unit (DU) portions.

DETAILED DESCRIPTION

In today's telecom networks Core Nodes maintain the UE context with permanent identifiers like SUPI & IMSI. And Access nodes maintain the UE context dynamically with identifiers like STMSI, RNTI etc. The contexts at Access nodes are temporary and exist till the node is handling the UE connectivity. As soon as the UE moves to other Access Nodes this context is deleted. Hence for Policy enforcement and related operations the responsibility lies on the Core Nodes and the Access Nodes just provide with the needed updates (e.g. location) to the Core Nodes. This is also done keeping in mind security of the User.

With the advent of ORAN and 5G there are many use cases that need the dynamic data of UE to calculate UE mobility and other parameters so that related policies can be enforced. Tasking Core Nodes for these operations will add to the overhead of processing and subsequent delays. Since ORAN RIC will be a centralized entity in the Access, apt solution will be to have a semi-permanent UE context in ORAN RIC that can use the dynamic data of UE collected from Access Nodes (O-CU/O-DU, O-eNB) and enforce related policies.

As many 5G experiences require low latency, 5G specifications like Control and User Plane Separation (CUPS), functional RAN splits and network slicing, require advanced RAN virtualization combined with SDN. This combination of virtualization (NFV and containers) and SDN is necessary to enable configuration, optimization and control of the RAN infrastructure at the edge before any aggregation points. This is how the RAN Intelligent Controller (RIC) for Open RAN was born—to enable eNB/gNB functionalities as X-Apps on northbound interfaces.

RIC provides advanced control functionality, which delivers increased efficiency and better radio resource management. These control functionalities leverage analytics and data-driven approaches including advanced ML/AI tools to improve resource management capabilities.

The Near-RT RIC hosts one or more xApps that use the E2 interface to collect near real-time information (on a UE basis or a cell basis). The Near-RT RIC control over the E2 nodes is steered via the policies and the data provided via A1 from the Non-RT RIC. The RRM (radio resource management) functional allocation between the Near-RT RIC and the E2 node is subject to the capability of the E2 node and is controlled by the Near-RT RIC.

O-RAN defined overall RIC architecture consists of four functional software elements: DU software function, multi-RAT CU protocol stack, the near-real time RIC itself, and orchestration/NMS layer with Non-Real Time RIC. They all are deployed as VNFs or containers to distribute capacity across multiple network elements with security isolation and scalable resource allocation. They interact with RU hardware to make it run more efficiently and to be optimized real-time as a part of the RAN cluster to deliver a better network experience to end users.

FIG. 1 is a schematic diagram of an Open RAN 4G/5G deployment architecture, as known in the prior art. The O-RAN deployment architecture includes an O-DU (Open-RAN distributed unit) and O-RU (OpenRAN radio unit), which together comprise a 5G base station in the diagram as shown. The O-CU-CP (central unit control plane) and O-CU-UP (central unit user plane) are ORAN-aware 5G core network nodes. An ORAN-aware LTE node, O-eNB, is also shown. As well, a near-real time RAN intelligent controller is shown, in communication with the CU-UP, CU-CP, and DU, performing near-real time coordination. As well, a non-real time RAN intelligent controller is shown, receiving inputs from throughout the network and specifically from the near-RT RIC and performing service management and orchestration (SMO), in coordination with the operator's network (not shown). Absent from the ORAN network concept is any integration of 2G, 3G. Also absent is any integration of a 2G/3G/4G DU or RU.

With the advent of ORAN and 5G, lot of UE mobility related monitoring and policy enforcement can be done at the edge or Access side instead of depending on the Core Nodes for the same. But the limitation is that the access nodes just maintain the UE context dynamically with identifiers like STMSI, RNTI etc. As soon as the UE moves out to other node or leaves coverage this context is deleted. Hence it becomes impossible to maintain the UE reference across these transitions and the reference to UE mobility information and patterns is lost. With this limitation, the policies can be implemented till such connectivity remains. We need a semi-permanent context of UE that stays even after the above referred connectivity transitions and the ORAN RIC running various algorithms can use this information and enforce the needed policies as per the use cases.

For real time monitoring of UE and related policy enforcement we can leverage the ORAN components that are directly connected to Access Nodes. Non Realtime (Non-RT) RIC is apt for this as it is a centralized entity that is connected to all the Access Node components through Near RT RICs. However there has to be a mechanism to maintain a semi-permanent UE context at Non Realtime RIC that can use the dynamic data of UE collected from Access Nodes (O-CU/O-DU, O-eNB) and enforce related policies. Today the contexts at Access nodes are temporary and exist till the node is handling the UE connectivity. As soon as the UE moves to other Access Nodes this context is deleted. Our proposed solution provides a mechanism to create a semi-permanent UE context at Non Realtime RIC which can be used to implement different solutions at ORAN.

There could be two scenarios of UE transition across the CU/DUs. Following summarizes the solution for both:

Scenario 1: UE is moving seamlessly from across CUs in connected mode using S1/X2/N2/Xn Handovers.

Non RT RIC downloads a policy to connected CUs that whenever a UE latches with Initial UE message, CU needs to send Identity Request to get the UEs SUPI. For more details regarding IMSI and SUPI in 4G/5G, and for all other purposes, the present disclosure incorporates 3GPP TS 23.503 and 3GPP TS 23.003 in their entirety.

Whenever UE attaches to CU/DU with initial UE message, the SUPI is learnt and sent back to Non RT RIC. Along with the SUPI CU/DU sends other parameters like CRNTI, STMSI (if available), cell information and other essential parameters as per the use cases.

The Non RT RIC allocates a fresh UE ID (if no contexts exist for this SUPI) and creates a context with parameters like Current Location, UE ID allotted by RIC, Current CRNTI, cell info etc.

The Non RT RIC sends this UE ID (referred as RIC_UEID forward) to CU that the CU maintains as part of the UE context information.

Whenever the UE moves within the CU served DUs, it updates the RIC about UEs mobility using RIC_UEID as the key.

Now whenever the UE moves from this CU to another CU through handover, the RIC_UEID is also transferred to the target CU as part of the handover context information exchanged.

Once the UE is successfully transferred to target CU, the target CU sends update to RIC with RIC_UEID.

The RIC then updates the UE context with the provided details.

Table 1.1 depicts this scenario.

TABLE 1.1

| TABLE 1.1 | | | | |
|---|---|---|---|---|
| UE context at RIC Scenario 1 where UE is moving and HO from CU1 to CU2 (SUPI learned at CU by identity request and then SUPI and STMSI if learnt copied across) | | | | |
| Current Location | RIC_UEID | Current CRNTI | SUPI | STMSI |
| DU1 | ABCD | 1 | 123456 | 9999 |
| DU2 | ABCD | 2 | 123456 | 9999 |
| DU3 | ABCD | 3 | 123456 | 9999 |
| DU4 | ABCD | 4 | 123456 | 9999 |

Scenario 2: UE is moving across DUs/CUs in idle mode by doing Service Request/TAU/Initial Registration Request.

Non RT RIC downloads a policy to connected CUs that whenever a UE latches with Initial UE message, CU needs to send Identity Request to get the UEs SUPI.

Whenever UE attaches to CU/DU with initial UE message, the SUPI is learnt and sent back to Non RT RIC. Along with the SUPI CU/DU sends other parameters like CRNTI, STMSI (if available), cell information and other essential parameters as per the use cases.

The Non RT RIC allocates a fresh UE ID (if no contexts exist for this SUPI) and creates a context with parameters like Current Location, UE ID allotted by RIC, Current CRNTI, cell info etc.

The Non RT RIC sends this UE ID (referred as RIC_UEID forward) to CU that the CU maintains as part of the UE context information.

UE releases the S1/N2 connection at the serving DU and moves to another DU/CU and does Service Request/TAU/Initial Registration Request to establish S1/N2 connection.

SUPI is learned at current CU by performing identity request and this SUPI is sent to RIC along with other relevant parameters.

Since RIC already has a context for this SUPI which it finds by doing a lookup, RIC updates this context with latest information provided by current CU.

Table 1.2 depicts this scenario.

TABLE 1.2

Figure 4:
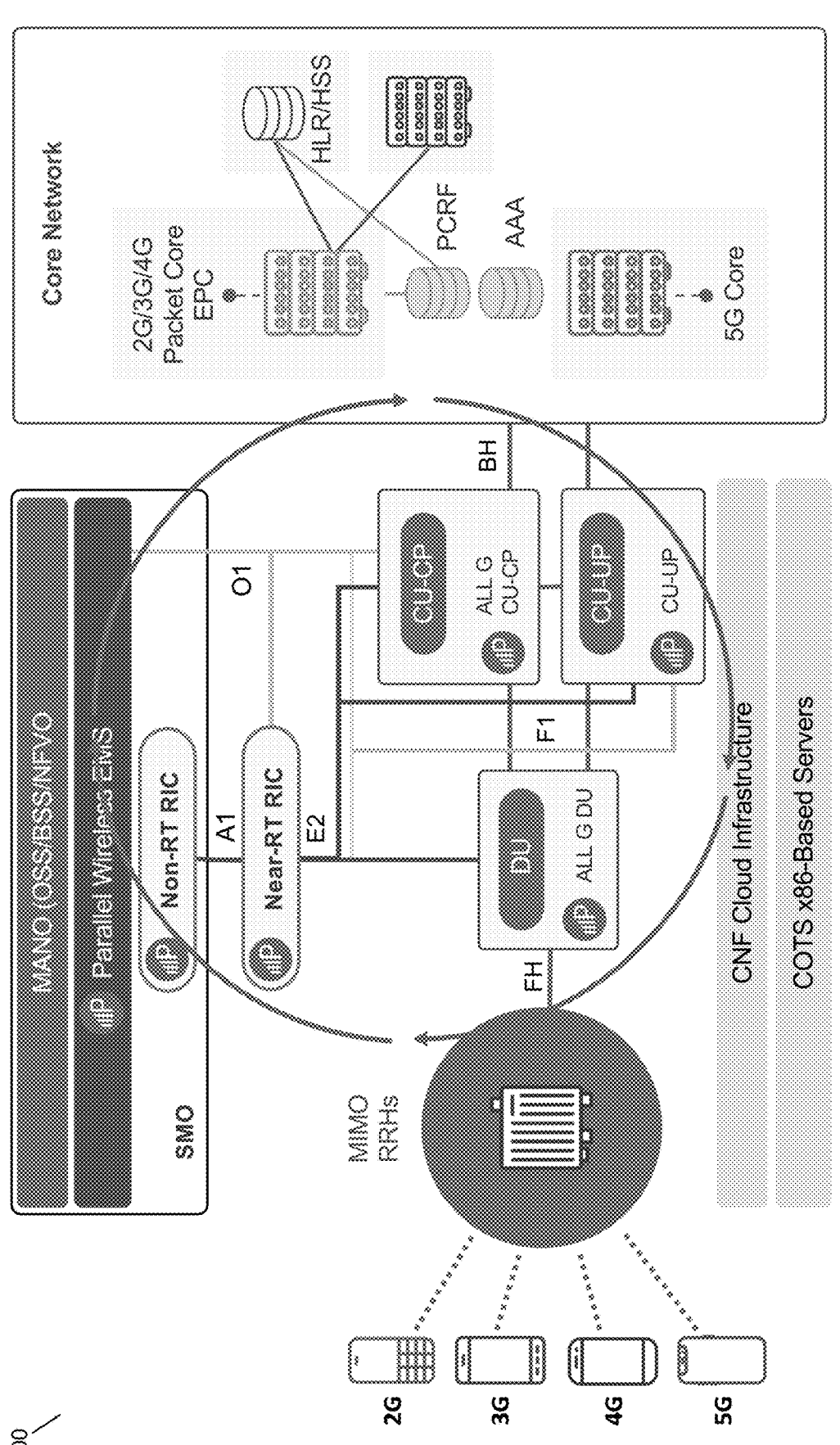
FIG. 4 is a schematic diagram of a multi-RAT RAN deployment architecture, in accordance with some embodiments.

In some embodiments, a radio tower with a remote radio head (RRH) may support multiple RATs, 2G/3G/4G/5G, but without requiring four generations of radio base stations. Instead, one or more software-upgradable, remotely configurable base stations is coupled to radio heads and filters that are able to operate on the appropriate frequencies for 2G, 3G, 4G, and 5G RATs. The multiple BBUs located at the bottom of the typical radio tower have been replaced with one or more vBBUs, virtual baseband units that are rearchitected to use modern virtualization technologies. FIG. 4 can be enabled using a technology like CPRI or eCPRI, which enables digitization and transfer of radio I/Q samples for further processing at a BBU or vBBU.

Where virtualization is described herein, one having skill in the cloud technology arts would understand that a variety of technologies could be used to provide virtualization, including one or more of the following: containers, Kubernetes, Docker, hypervisors, virtual machines, hardware virtualization, microservices, AWS, Azure, etc. In a preferred embodiment, containerized microservices coordinated using Kubernetes are used to provide baseband processing for multiple RATs as deployed on the tower.

The inventors have appreciated that the use of the 3GPP model for functional splits is flexible and may be used to provide deployment flexibility for multiple RATs, not just 5G. Functional splits can be used in conjunction with cloud and virtualization technology to perform virtualization of, e.g., the RU, DU, and CU of not just 5G but also 4G, 3G, 2G, etc. This enables the use of commodity off-the-shelf servers, software-defined networking that can be rapidly upgraded remotely, and lower power requirements by using modern hardware compared to legacy hardware.

In some embodiments, a fronthaul link connects the RRH to a DU+CU, which runs a variety of virtualized RAT processing on a vBBU machine. The fronthaul link may be CPRI or eCPRI, or another similar interface. The DU+CU may be located at the base of the tower or at a further remove as enabled by different latency envelopes; typically this will be close to the tower for a 5G deployment. In some embodiments, a HetNet Gateway (HNG), which performs control and user plane data aggregation and gateway services, may be the next destination via the backhaul connection; the HNG may disaggregate the different RAT communications to be directed to different RAT cores (i.e., a 2G core, a 3G core, a 4G core, a 5G core and so on). In some embodiments and in certain situations, an HNG may perform virtualization or interworking of aggregated communications such that, e.g., 2G communications may be interworked to 4G IP voice communications and routed through the 4G core. In some embodiments, the HNG may perform virtualization of one or more cores such that the communications may not need to terminate at a RAT-specific core; this feature may be combined with interworking in some embodiments. In some embodiments, no aggregator may be present and the vBBU may directly route communications to each RAT's individual core.

In some embodiments, wherein a deployment architecture is used with a non-RT RIC overseeing multiple near-RT RICs, each near-RT RIC manages multiple regions, each region having a base station split up into a CU and a DU. A 5G UE moves from Region A to Region B. When it moves between the first near-RT RIC and the second near-RT RIC, the non-RT RIC uses its retained information regarding the UE's ID to provide appropriate services without assigning a fresh context.

In some embodiments, where non-RT and near-RT RIC coordination is enabled for 4G, a non-RT RIC oversees multiple near-RT RICs, where the RICs are 4G capable. Each near-RT RIC manages multiple regions, each region having a ORAN-compatible eNodeB. A 4G UE moves from Region A to Region B. When it moves between the first near-RT RIC and the second near-RT RIC, the non-RT RIC uses its retained information regarding the UE's ID to provide appropriate services without assigning a fresh context.

Figure 2:
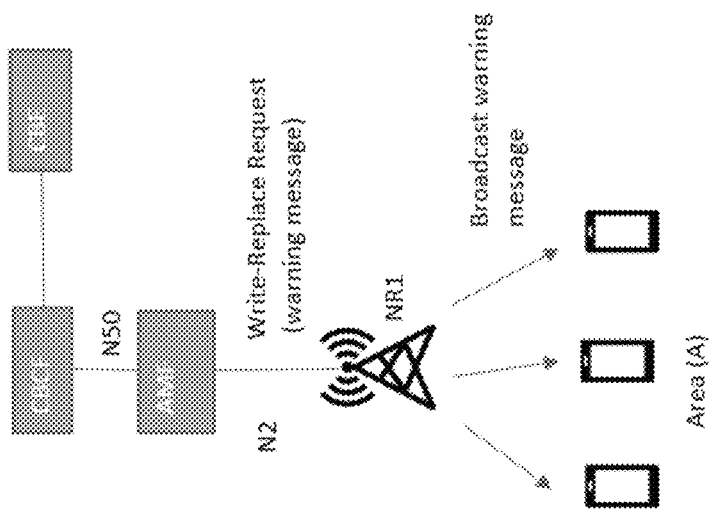
FIG. 2 is a schematic diagram of a public warning system architecture for 5G, in accordance with some embodiments.

FIG. 2 shows the PWS (public warning system) architecture when 5G Core and the new 5G Radio is used. Upon a request from the CBE, the CBCF/PWS initiates the Write-Replace Warning procedure by sending a Write-Replace Warning Request message to the AMF over N50 interface. The AMF initiates the procedure by sending a WRITE-REPLACE WARNING REQUEST message to the NG-RAN node. Upon receipt of the WRITE-REPLACE WARN-ING REQUEST message, the NG-RAN node shall prioritize its resources to process the warning message. The Write Replace Warning Procedures cause either a Cell ID List, Tracking Area List, or Emergency Area List generated with a list of areas together with the warning contents included in the message. The NR upon receipt of Write Replace request from the AMF, floods these Write Replace Warning messages in the specified tracking area, emergency area or cells, with the warning message. At any point of time CBCF/PWS can cancel a broadcast by specifying the message ID that is currently actively broadcasted.

Figure 3:
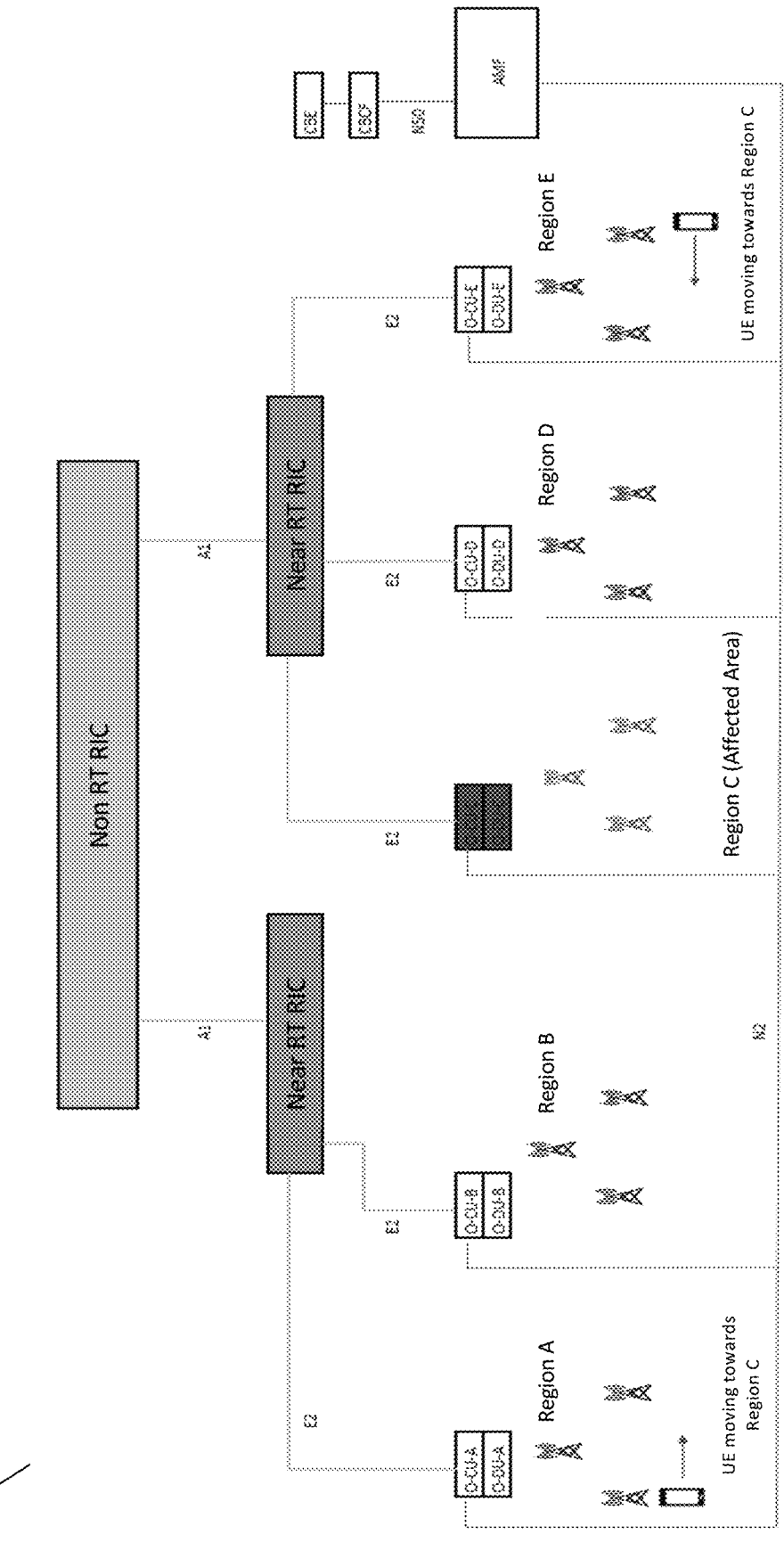
FIG. 3 is a schematic diagram of a public warning system architecture in operation, in accordance with some embodiments.

FIG. 3 is a schematic diagram of a public warning system architecture in operation, in accordance with some embodiments. Whenever any emergency happens (Natural disaster or some criminal activity etc.) in Region C, which is served by O-CU-C, AMF sends Warning (Write-Replace Request) message to O-CU-C. O-CU-C broadcasts this warning alert message to all UEs in Region C. People in Region C get alerted and take necessary action.

However, users currently being served in Region A and are moving towards Region C will not receive any alert from network and will not be intimated about the emergency until they reach the affected area.

We can lessen the overall impact by sending warning messages to such UE's that are moving towards Region C, in some embodiments before they enter Region C. So, People being notified can refrain from getting into impacted area i.e. Region C.

The present disclosure considers the solution of using the ORAN Architecture and making use of the centralized entity RIC that is aware about the network topology and is connected to all O-CU/O-eNB. The RIC uses the UE Mobility Context which is updated on every UE Movement and calculates the UE's trajectory. Trajectory calculation may be by an updated UE mobility context, that may be updated across multiple Near-RT RIC tracking domains in some embodiments, in some embodiments each time the location of the UE changes, or may be by using historical position of the UE, which may involve GPS or another UE-originated location signal requested from the UE, or by using the UE's history of cells visited combined with geographically associating those cells with the physical location of those cells, or by using historical location for velocity, or by using measured UE signals to determine velocity, or some combination of these techniques, or by another method.

Once the RIC determines that UE is moving to the impacted region, it will trigger the corresponding O-CU/O-eNB to alert the UE. In some embodiments, the Non-RT RIC is considered to be the RIC for this purpose. Using the Non-RT RIC enables emergency warning services for UEs from multiple Near RT RIC control domains, not just a same Near RT RIC as an affected area, in some embodiments.

RIC will provision trigger at the O-CU's/O-eNB's such that whenever there is any PWS message received from AMF/MME, same needs to be informed to RIC.

Whenever there is an emergency, O-CU/O-eNB (Region C in FIG. 3) will receive a Write Replace Warning message from AMF/MME (for 4G when 4G is involved; 4G and 5G NR Non-Standalone (NSA) is also considered to be within the scope of this disclosure).

O-CU/O-eNB will broadcast the warning messages in the affected Region and will additionally inform the RIC about this Warning message.

RIC maintains the UE Mobility Context as described above.

There could be many UE's that would be moving towards affected Region C.

As RIC is maintaining the UE Mobility context, it will be able to calculate the UE's mobility direction as well as current position.

When the RIC is able to determine the UE mobility is towards Region C, it will trigger the corresponding O-CU/

O-eNB to alert such UE's (UE moving from Region A to Region B to Region C or moving from Region E to Region D to Region C).

FIG. 4 is a schematic diagram of a multi-RAT RAN deployment architecture, in accordance with some embodiments. Multiple generations of UE are shown, connecting to RRHs that are coupled via fronthaul to an all-G Parallel Wireless DU. The all-G DU is capable of interoperating with an all-G CU-CP and an all-G CU-UP. Backhaul may connect to the operator core network, in some embodiments, which may include a 2G/3G/4G packet core, EPC, HLR/HSS, PCRF, AAA, etc., and/or a 5G core. In some embodiments an all-G near-RT RIC is coupled to the all-G DU and all-G CU-UP and all-G CU-CP. Unlike in the prior art, the near-RT RIC is capable of interoperating with not just 5G but also 2G/3G/4G.

The all-G near-RT RIC may perform processing and network adjustments that are appropriate given the RAT. For example, a 4G/5G near-RT RIC performs network adjustments that are intended to operate in the 100 ms latency window. However, for 2G or 3G, these windows may be extended. As well, the all-G near-RT RIC can perform configuration changes that takes into account different network conditions across multiple RATs. For example, if 4G is becoming crowded or if compute is becoming unavailable, admission control, load shedding, or UE RAT reselection may be performed to redirect 4G voice users to use 2G instead of 4G, thereby maintaining performance for users. As well, the non-RT RIC is also changed to be a near-RT RIC, such that the all-G non-RT RIC is capable of performing network adjustments and configuration changes for individual RATs or across RATs similar to the all-G near-RT RIC. In some embodiments, each RAT can be supported using processes, that may be deployed in threads, containers, virtual machines, etc., and that are dedicated to that specific RAT, and, multiple RATs may be supported by combining them on a single architecture or (physical or virtual) machine. In some embodiments, the interfaces between different RAT processes may be standardized such that different RATs can be coordinated with each other, which may involve interworking processes or which may involve supporting a subset of available commands for a RAT, in some embodiments. Where "all-G" is specified it is understood that various combinations of radio access technologies, or Gs, may be combined and that not all of 2G/3G/ 4G/5G/Wi-Fi are required to be present in each embodiment.

Figure 5:
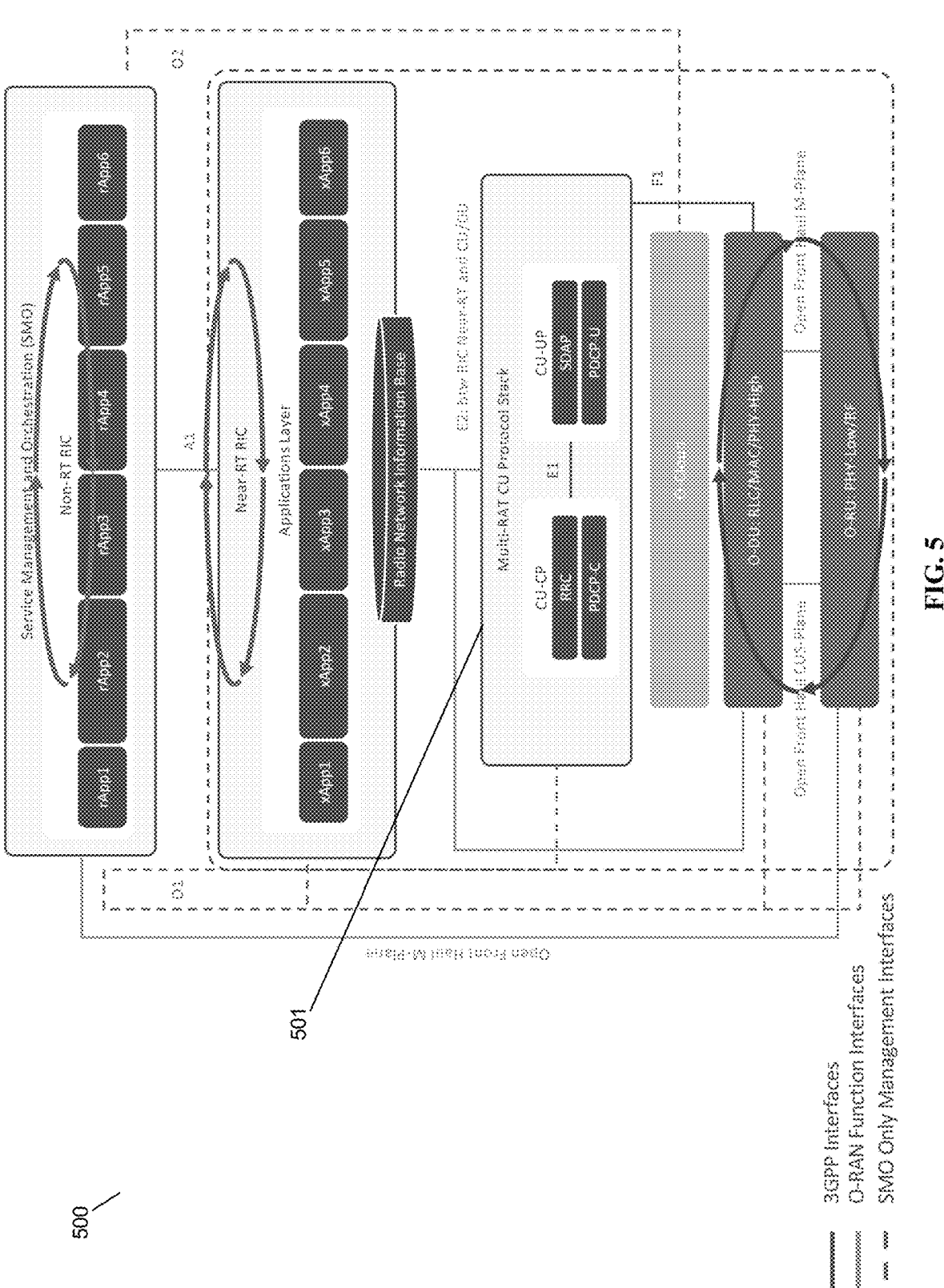
FIG. 5 is an additional schematic diagram of a multi-RAT RAN deployment architecture, in accordance with some embodiments.

FIG. 5 is an additional schematic diagram of a multi-RAT RAN deployment architecture, in accordance with some embodiments. The multi-RAT CU protocol stack 501 is configured as shown and enables a multi-RAT CU-CP and multi-RAT CU-UP, performing RRC, PDCP, and SDAP for all-G. As well, some portion of the base station (DU or CU) may be in the cloud or on COTS hardware (O-Cloud), as shown. Coordination with SMO and the all-G near-RT RIC and the all-G non-RT RIC may be performed using the A1 and O2 function interfaces, as shown and elsewhere as specified by the ORAN and 3GPP interfaces for 4G/5G. The non-RT RIC and the near-RT RIC coordinate; xApps run on the near-RT RIC and rApps run on the non-RT RIC, each virtualized in containers, in some embodiments.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

In some embodiments, a SIM card may provide information required for authenticating the simulated UE to the evolved packet core (EPC). The SIM card may be an eSIM, or no SIM. In a 4G environment an international mobile equipment identity (IMEI), international mobile subscriber identity (IMSI) may be used. In a 5G environment a Subscription Permanent Identifier (SUPI) may be used. The SUPI may be an IMSI. In some embodiments, a TMSI or GUTI may be used in place of the IMSI or IMEI or SUPI. In some embodiments, a subscription concealed identifier (SUCI) may be used in place of a SUPI. Each of the identifiers described in this paragraph may be solicited by the network from the UE, in accordance with the present disclosure, and may be retained in the core network with a mapping to the RIC_UEID. In some embodiments, support for the present disclosure and the mapping of a UE may also be extended to 2G or 3G, and support may be provided at a near-RT RIC and non-RT RIC with 2G and/or 3G functionality, as appropriate.

Wired or wireless fronthaul or backhaul may be used. Wired fronthaul or backhaul may be Ethernet-based (including Gigabit Ethernet), or a fiber-optic connection, or a cable-based connection, in some embodiments. Additionally, wireless backhaul may be provided in addition to wireless transceivers 512 and 514, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 502 for reconfiguration.

A GPS module 530 may also be included, and may be in communication with a GPS antenna 532 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 532 may also be present and may run on processor 502 or on another processor, or may be located within another device, according to the methods and procedures described herein.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony, in addition to, on top of, in conjunction with, or integrated with the base stations described herein.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method of providing UE mobility context creation in 4G and 5G systems, comprising:
   downloading, by a non-real time (non-RT) Radio Intelligent Controller (RIC), a policy to connected centralized units (CUs) that whenever a User Equipment (UE) attaches to a CU and the UE's location changes, the Non-RT RIC be updated about UE's mobility;
   allocating, by the Non RT RIC, a fresh UE identifier (ID) and creating a context with parameters including Current Location, UE ID allotted by RIC, Current cell radio network temporary identifier (C-RNTI), and cell information;
   sending, by the Non RT RIC, the fresh UE ID to the CU that the CU maintains as part of the UE context information;
   determining whenever the UE moves within the CU served distributed units (DUs), and updating the Non-RT RIC about the UE's mobility using the UE ID allotted by RIC as the key;
   sending, by the target CU once the UE is successfully transferred to target CU, the update to RIC with the UE ID allotted by RIC;
   updating, by the RIC, the UE context with the provided details;
   using the UE context updated on every UE movement to calculate the UE's trajectory;
   determining the UE is moving to an impacted region; and
   triggering a corresponding Open Radio Access Network (O-RAN) Central Unit (O-CU)/O-RAN eNodeB (O-eNB) to alert the UE using a public warning system (PWS) message.

2. The method of claim 1, further comprising determining that the UE is moving seamlessly from across CUs in connected mode using S1/X2/N2/Xn Handovers.

3. The method of claim 1, further comprising downloading, by the non-RT RIC, a policy to connected CUs that whenever a UE latches with initial UE message, CU sends an Identity Request to get the UE's subscription permanent identifier (SUPI).

4. The method of claim 1, further comprising downloading, by a non-RT RIC, a policy to connected CUs that whenever the UE attaches to the CU/DU with the initial UE message, the subscription permanent identifier (SUPI) is learnt and sent back to the Non-RT RIC, along with the SUPI CU/DU and sends cell radio network temporary identifier (C-RNTI), short temporary mobile subscriber identifier (STMSI), cell information.

5. The method of claim 1, further comprising determining whenever the UE moves from this CU to another CU through handover, transferring the the UE ID allotted by RIC to the target CU as part of the handover context information exchanged.

6. The method of claim 1, wherein the CU is a 5G New Radio (NR) base station with separate centralized unit (CU) and distributed unit (DU) portions.

\* \* \* \* \*